United States Patent
Shah et al.

(10) Patent No.: US 12,405,864 B2
(45) Date of Patent: Sep. 2, 2025

(54) BACKUP RESOURCE CHANGES IN A VERSION CONTROL SYSTEM WITH DYNAMIC REPLICATION AND RESTORATION

(71) Applicant: International Business Machines Corporation, Armonk, NY (US)

(72) Inventors: Mihir Rohit Shah, Holly Springs, NC (US); Amitabh Prasad, Pune (IN); Shikha Srivastava, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 18/535,039

(22) Filed: Dec. 11, 2023

(65) Prior Publication Data

US 2025/0190315 A1 Jun. 12, 2025

(51) Int. Cl.
*G06F 11/14* (2006.01)
*G06F 11/20* (2006.01)

(52) U.S. Cl.
CPC ...... *G06F 11/1469* (2013.01); *G06F 11/1464* (2013.01); *G06F 11/2082* (2013.01)

(58) Field of Classification Search
CPC .. G06F 11/14; G06F 11/1464; G06F 11/1469; G06F 11/2082
See application file for complete search history.

(56) References Cited

U.S. PATENT DOCUMENTS

| | | | |
|---|---|---|---|
| 10,469,318 B1* | 11/2019 | Parthasarathy | H04L 41/0859 |
| 11,157,253 B1* | 10/2021 | Shteyman | G06F 8/71 |
| 11,200,081 B2* | 12/2021 | Croteau | G06F 9/5077 |
| 2008/0189679 A1* | 8/2008 | Rodriguez | G06F 8/34 717/105 |
| 2009/0259612 A1* | 10/2009 | Hanson | H04L 69/22 706/47 |
| 2011/0246813 A1* | 10/2011 | Collier | G06F 11/2035 714/E11.071 |

(Continued)

FOREIGN PATENT DOCUMENTS

CN 110837394 A 2/2020

OTHER PUBLICATIONS

Anonymous, "A Method and System to Manage Container Platform ConfigMaps Efficiently for Multiple Environments," An IP.com Prior Art Database Technical Disclosure, IPCOM000269735D, May 10, 2022, 6 pages.

(Continued)

*Primary Examiner* — Kamini B Patel
(74) *Attorney, Agent, or Firm* — Yee & Associates, P.C.

(57) ABSTRACT

Backing up resource changes in real time for resource restoration is provided. An indication that resources of a primary controller node need to be restored on a particular primary controller node in an orchestration environment in accordance with changes in the resources is monitored for. The resources are restored on the particular primary controller node in accordance with the changes in the resources based on the resources of a secondary controller node in the orchestration environment in response to the computer determining the indication was detected that the resources need to be restored on the particular primary controller node in accordance with the changes in the resources based on the monitoring for the indication.

20 Claims, 4 Drawing Sheets

(56) References Cited

U.S. PATENT DOCUMENTS

| | | | |
|---|---|---|---|
| 2020/0412625 A1* | 12/2020 | Bagarolo | H04L 43/0805 |
| 2021/0286653 A1* | 9/2021 | Karve | G06F 9/5055 |
| 2024/0273001 A1* | 8/2024 | Eda | G06F 11/1461 |
| 2024/0311208 A1* | 9/2024 | Kandasamy | G06F 9/5072 |
| 2024/0333704 A1* | 10/2024 | Atur | H04L 63/0807 |
| 2025/0004451 A1* | 1/2025 | Yu | G05B 19/4185 |
| 2025/0110728 A1* | 4/2025 | Talmor | G06F 8/71 |

OTHER PUBLICATIONS

D'Amore, "GitOps and ArgoCD: Continuous deployment and maintenance of a full stack application in a hybrid cloud Kubernetes environment," Webthesis Libraries, 2021, 117 pages, Politecnico di Torino, accessed Nov. 1, 2023, https://webthesis.biblio.polito.it/18142/.

* cited by examiner

BACKUP RESOURCE CHANGES IN A VERSION CONTROL SYSTEM WITH DYNAMIC REPLICATION AND RESTORATION

BACKGROUND

The disclosure relates generally to orchestration environments and more specifically to backing up resources in an orchestration environment.

Orchestration is the coordination and management of multiple nodes (i.e., computers, servers, or the like), applications, and/or services, assembling multiple tasks to execute a larger workflow or process. These processes can consist of multiple tasks that are automated and can involve multiple nodes in a cluster.

An orchestration environment, platform, architecture, or the like, such as, for example, Kubernetes® (a registered trademark of the Linux Foundation of San Francisco, California, USA), provides an environment for automating deployment, scaling, and operations of application workloads across clusters of host nodes. An orchestration platform includes a controller node, which is a main controlling unit of a cluster of host nodes (also known as worker nodes, compute nodes, and the like), managing the cluster's workload, and directing communication across the cluster. A worker node is a machine, either physical or virtual, where an application workload is deployed.

SUMMARY

According to one illustrative embodiment, a computer-implemented method for resource restoration is provided. A computer of a version control system monitors for an indication that resources of a primary controller node need to be restored on a particular primary controller node in an orchestration environment in accordance with changes in the resources. The computer restores the resources on the particular primary controller node in accordance with the changes in the resources based on the resources of a secondary controller node in the orchestration environment in response to the computer determining the indication was detected that the resources need to be restored on the particular primary controller node in accordance with the changes in the resources based on the monitoring for the indication. According to other illustrative embodiments, a computer system and computer program product for resource restoration are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
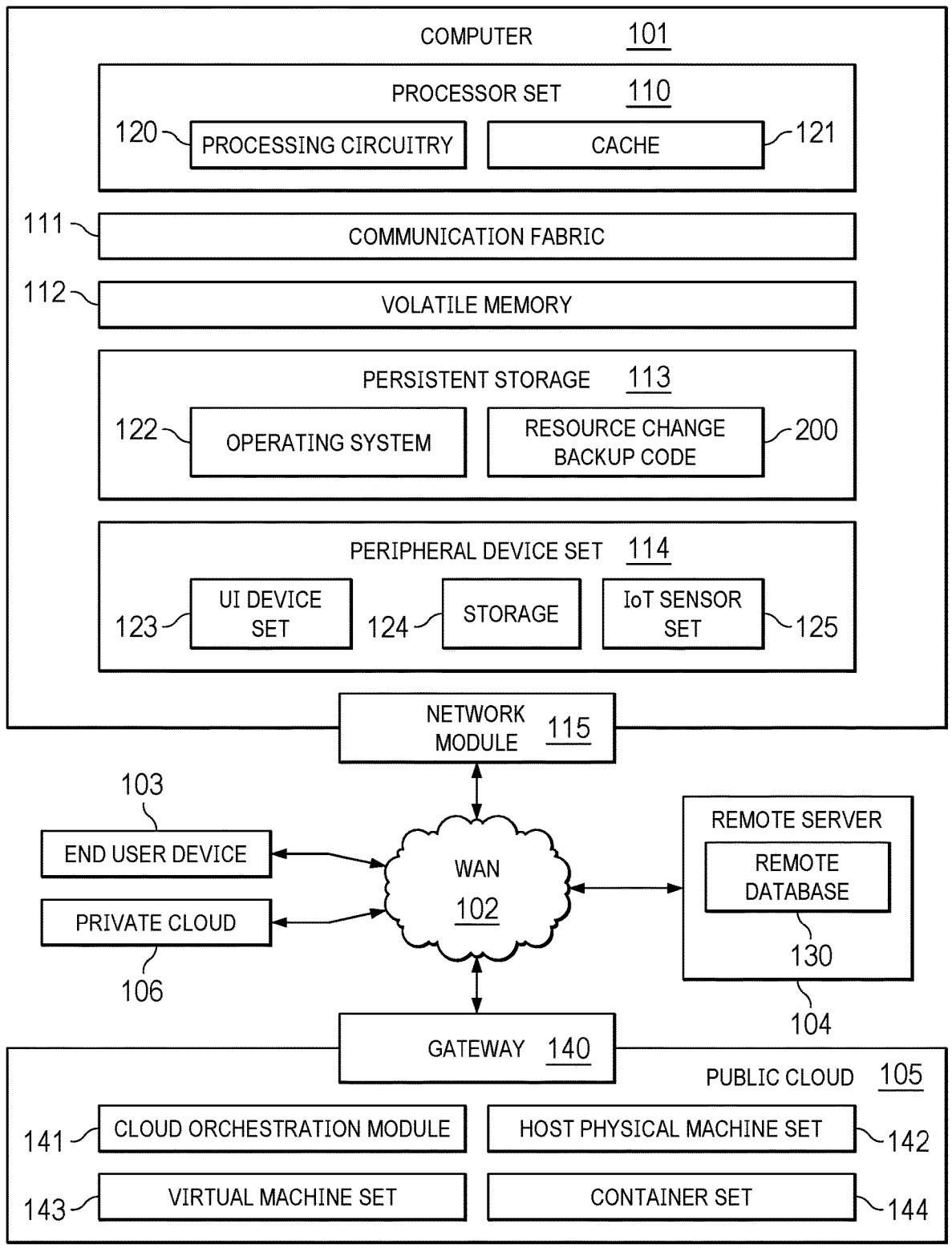
FIG. 1 is a pictorial representation of a computing environment in which illustrative embodiments may be implemented.
Figure 2:
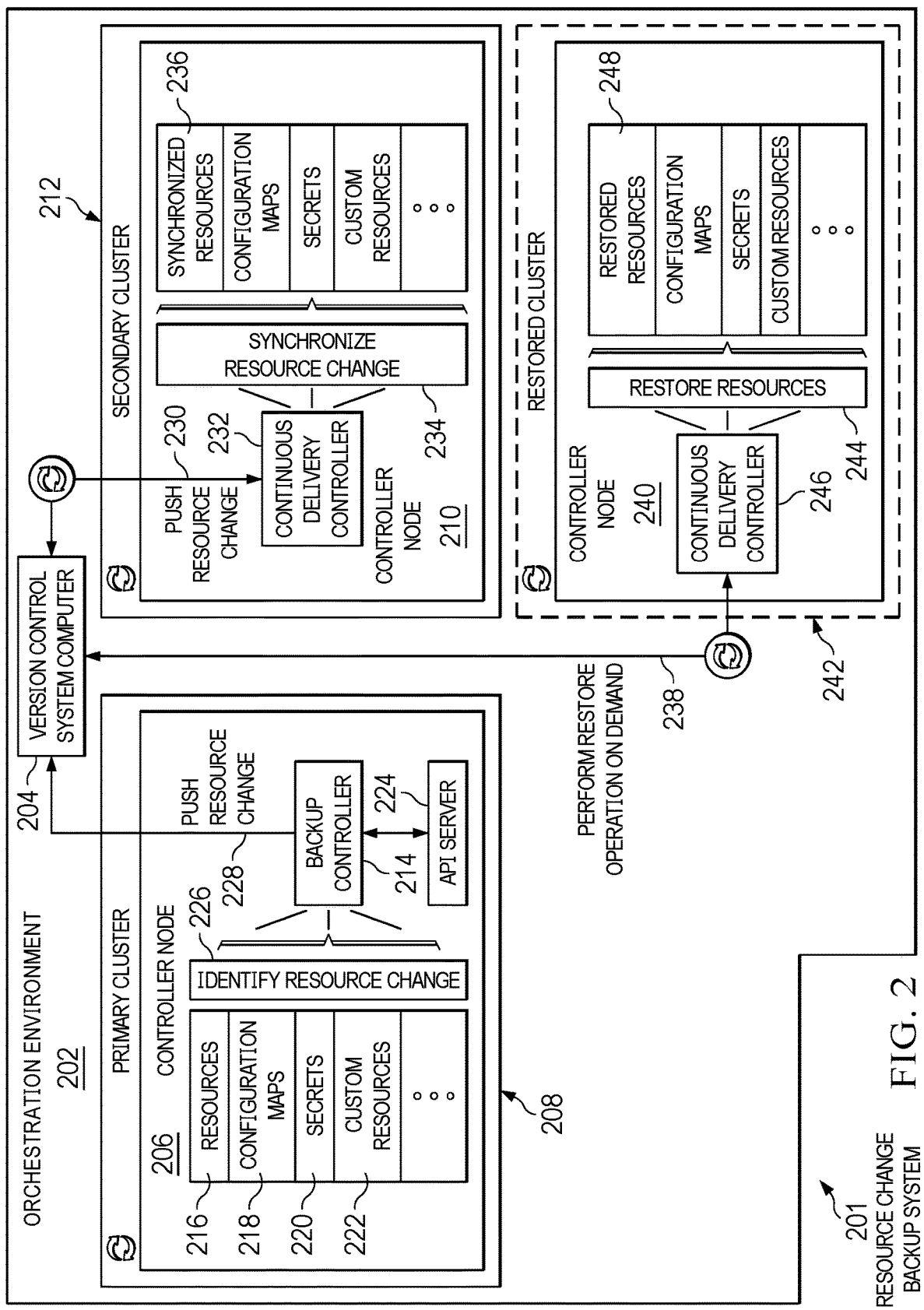
FIG. 2 is a diagram illustrating an example of a resource change backup system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an orchestration environment (e.g., Kubernetes) for the execution of at least some of the computer code involved in performing the inventive methods of illustrative embodiments, such as resource change backup code 200. For example, resource change backup code 200 provides dynamic backup of resources corresponding to a running cluster of the orchestration environment within a version control system and provides restoration of backed up resources when needed (e.g., in response to a disaster, restore command, or the like). It should be noted that resource change backup code 200 can provide point-in-time restoration of resources, as well as real time restoration of resources (e.g., continuous live resource replication in a replicated cluster). Resource change backup code 200 identifies incremental changes in the resources (e.g., configuration maps, secrets, custom resources, and the like, which comprise an application) of the orchestration environment at the time those incremental resource changes occur and only store those incremental resource changes in the version control system. Storing the incremental resource changes as those changes occur provides resource change backup code 200 fine gain control over those changes and provides an ability to restore the state of a particular resource at any given time as needed. Resource change backup code 200 computes the change in resource state at the version control system based on the incremental change in the resource received from a backup controller on a controller node of a primary cluster of nodes where the resource resides. Furthermore, resource change backup code 200 can merge a group of incremental changes of a particular resource into a block of incremental changes for that particular resource in the version control system as needed to make the resource state restoration process more efficient (e.g., faster).

In addition to resource change backup code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and resource change backup code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 corresponds to the version control system located in the orchestration environment. Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in resource change backup code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a user of the dynamic resource change backup and restoration services provided by computer 101), and may take any of the forms discussed above in connection with computer 101. EUD 103 typically receives helpful and useful data from the operations of computer 101. For example, in a hypothetical case where computer 101 is designed to provide a resource restoration recommendation to the end user, this recommendation would typically be communicated from network module 115 of computer 101 through WAN 102 to EUD 103. In this way, EUD 103 can display, or otherwise present, the resource restoration recommendation to the end user. In some embodiments, EUD 103 may be a client device, such as thin client, heavy client, mainframe computer, desktop computer, laptop computer, tablet computer, smart phone, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a resource restoration recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. Host physical machine set 142 represents a set of controller nodes and a set of host nodes in each cluster of a plurality of clusters (e.g., a primary cluster, a secondary cluster, and the like) in the orchestration environment.

The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors.

Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Current orchestration environment backup solutions provide means to backup resources of the orchestration environment, but these current orchestration environment backup solutions only run periodically and backup all the resources of the orchestration environment, which will have an impact on the recovery point objective (RPO) (i.e., increase the RPO). Also, by backing up all the resources of the orchestration environment, these current orchestration environment backup solutions limit the number of backups due to storage constraints. In addition, these current orchestration environment backup solutions perform backup and restore as two separate processes. These current orchestration environment backup solutions do not provide support for incremental resource changes in the orchestration environment. Moreover, no orchestration environment backup solution currently exists that can recover the backup directly from a version control system.

In contrast, illustrative embodiments utilize a version control system as a backup target for the incremental resource changes in the orchestration environment. Illustrative embodiments generate a backup controller (e.g., a pod, operator, or the like) on the controller node of the orchestration environment. The backup controller monitors for any change (e.g., a create, update, or delete operation) in any resource of interest (e.g., those resources tagged as backup=true) in a cluster or multiple clusters of nodes. It should be noted that the backup controller monitors for changes only in those resources of interest, for example tagged as backup=true, and ignores any other resource not so tagged in the orchestration environment. It should be noted that illustrative embodiments can utilize any type of tag, flag, indicator, or the like to identify the resources of interest to monitor for changes. The backup controller automatically propagates all changes to any of those tagged resources of interest to the version control system as the changes occur in real time. In other words, illustrative embodiments only store the changes to the resources, and not the entirety of the resources themselves, which decreases storage space utilization and network traffic payloads, which increases orchestration environment performance.

Thus, by only storing the resource changes, the version control system can maintain a history of all resource changes occurring in the orchestration environment. Consequently, the version control system can search back into the resource changes and determine when a particular resource change occurred in the event a roll back to a particular point-in-time is needed. However, it should be noted that alternative illustrative embodiments can monitor resources cluster-wide (e.g., all resource deployments), namespace-wide (e.g., all resource deployments in a namespace), or the like.

In response to illustrative embodiments receiving a set of resource changes from the backup controller via a network, illustrative embodiments automatically commit each resource change in the version control system as backup. In addition, illustrative embodiments can include a message indicating a reason for the resource change (e.g., resource update, fix, or the like) in the resource change backup. Further, illustrative embodiments can tag any special events or days in the version control system regarding a particular resource change backup (e.g., a specific public release of the application).

Furthermore, illustrative embodiments push the resource change backups from the version control system to a continuous delivery controller (e.g., ArgoCD or the like) on a secondary controller node of a secondary cluster (e.g., backup cluster, disaster recovery cluster, or the like) in the orchestration environment to continuously replicate a state of a particular resource in the primary cluster into the secondary cluster (i.e., synchronize the resource changes of the primary cluster in the secondary cluster forming a real time backup cluster). Alternatively, the continuous delivery controller can continuously pull the resource change backups from the version control system. As a result, illustrative embodiments can restore a particular backup of a set of resource changes on a given cluster (i.e., the primary cluster or another cluster when the primary cluster is down for an extended period) via the continuous delivery controller of the secondary cluster.

Thus, illustrative embodiments can synchronize a point-in-time resource change backup version, a real time resource replication using a replicated cluster (e.g., active-to-active mode), or a selected application release version, to a given cluster in the event the primary cluster goes down (e.g., during a natural or human-caused disaster). Because illustrative embodiments replicate resource state in the version control system, illustrative embodiments can keep the recovery point objective close to zero during a disaster or anytime when a cluster needs to be restored. Accordingly, by utilizing both the backup controller and the continuous delivery controller, illustrative embodiments ensure that the state of any resource of interest can be replicated in real time for restoration of resources in a cluster when needed.

Thus, illustrative embodiments provide one or more technical solutions that overcome a technical problem with an inability of current orchestration environment backup solutions to backup incremental resource changes in real time within a version control system. As a result, these one or more technical solutions provide a technical effect and practical application in the field of orchestration environments.

With reference now to FIG. 2, a diagram illustrating an example of a resource change backup system is depicted in accordance with an illustrative embodiment. Resource change backup system 201 is implemented in orchestration environment 202, which can be, for example, computing environment 100 in FIG. 1. Resource change backup system 201 is a system of hardware and software components for automatically backing up incremental resource changes in real time within a version control system to provide resource restoration in a controller node of a cluster as needed.

In this example, resource change backup system 201 includes version control system computer 204, controller node 206 of primary cluster 208, and controller node 210 of secondary cluster 212. Version control system computer 204 can be, for example, computer 101 in FIG. 1. Controller node 206 and controller node 210 can be, for example, computers in host physical machine set 142 in FIG. 1. Also, it should be noted that in this example controller node 206 is a primary controller node and controller node 210 is a secondary controller node (e.g., a backup controller node, disaster recovery controller node, or the like). However, it should be noted that resource change backup system 201 is intended as an example only and not as a limitation on illustrative embodiments. For example, resource change backup system 201 can include any number of version control system computers, controller nodes, and other devices and components not shown, such as host node clusters.

Version control system computer 204 establishes communication with backup controller 214 on controller node 206. Backup controller 214 is responsible for monitoring resources 216 of controller node 206 for any changes. In this example, resources 216 include configuration maps 218, secrets 220, custom resources 222, and the like corresponding to a distributed application running on a set of host nodes in primary cluster 208. Backup controller 214 communicates with API server 224 of controller node 206 to obtain the current state of each respective resource of resources 216.

At 226, backup controller 214 identifies a change in a resource based on monitoring resources 216 for any changes. At 228, in response to identifying the change in the resource, backup controller 214 automatically pushes the change in the resource to version control system computer 204 in real time as backup as the change occurred.

Version control system computer 204 is a source of truth for current resource state corresponding to any resource changes. Version control system computer 204 can store the initial state of each respective resource of resources 216, as well as the runtime definition of each respective resource.

At 230, version control system computer 204 pushes the change in the resource to continuous delivery controller 232 in controller node 210 of secondary cluster 212. Version control system computer 204 utilizes continuous delivery controller 232 to ensure that primary cluster 208 and secondary cluster 212 in orchestration environment 202 are synchronized regarding any resource changes in real time. For example, at 234, version control system computer 204 utilizes continuous delivery controller 232 to synchronize the change in the resource of resources 216 with controller node 210 to form synchronized resources 236. In other words, synchronized resources 236 are now identical to resources 216 having the change in the resource. Also, it should be noted that synchronized resources 236 contain the same resources as resources 216.

Furthermore, version control system computer 204 monitors controller node 210 for resource drift. For example, in response to identifying resource drift (i.e., identifying a change in a resource within controller node 210 that is not found in version control system computer 204), version control system computer 204 changes the state of that resource within controller node 210 back to the most recent state found in version control system computer 204 using continuous delivery controller 232 so that resource state is the same (i.e., synchronized with no difference) between controller node 206 of primary cluster 208 and controller node 210 of secondary cluster 212. A change of resource state that is not found in version control system computer 204 can, for example, be performed by an unauthorized user (e.g., malicious actor).

At 238, version control system computer 204 performs a restore operation on demand on controller node 240 of restored cluster 242. Controller node 240 can be controller node 206 of primary cluster 208 or another controller node of another cluster in orchestration environment 202. At 244, version control system computer 204 utilizes continuous delivery controller 246 to restore resources on controller node 240 to form restored resources 248 based on synchronized resources 236 of controller node 210. In addition, it should be noted that restored resources 248 contain the same resources as synchronized resources 236.

Figure 3A:
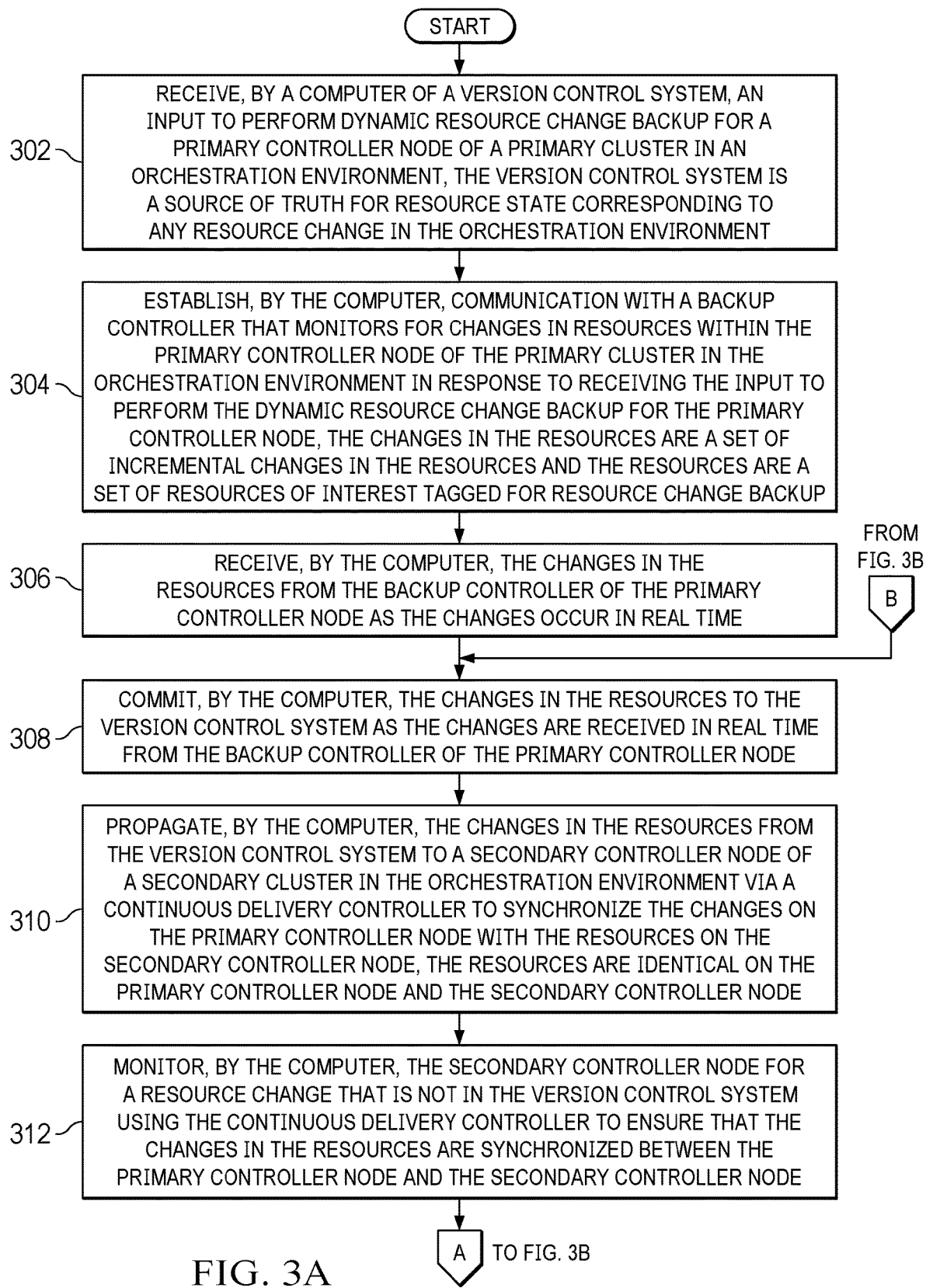
FIGS. 3A-3B are a flowchart illustrating a process for backing up resource changes in real time to provide resource restoration in accordance with an illustrative embodiment.
Figure 3B:
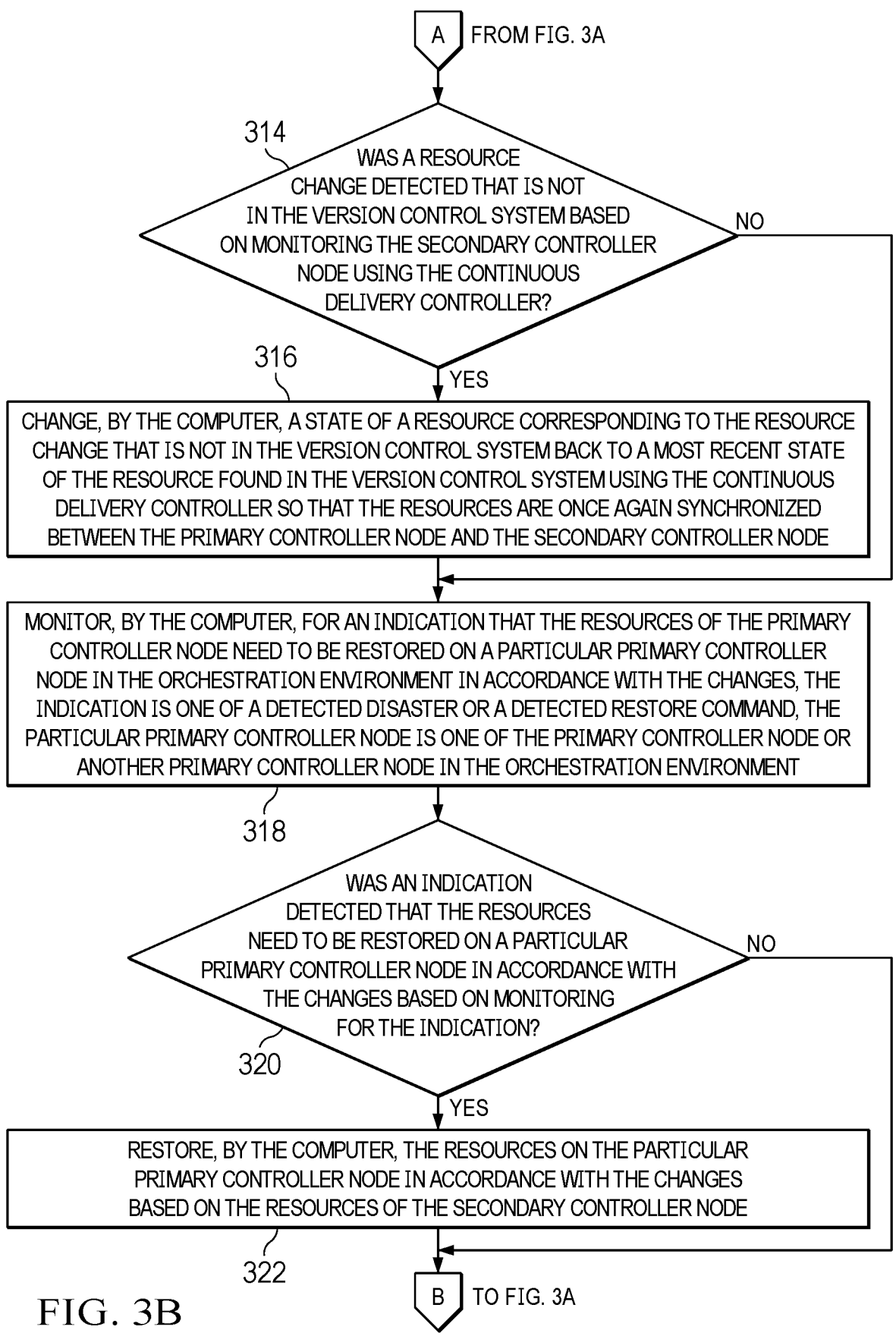

With reference now to FIGS. 3A-3B, a flowchart illustrating a process for backing up resource changes in real time to provide resource restoration is shown in accordance with an illustrative embodiment. The process shown in FIGS. 3A-3B may be implemented in a computer, such as, for example, computer 101 in FIG. 1 or version control system computer 204 in FIG. 2. For example, the process shown in FIGS. 3A-3B may be implemented by resource change backup code 200 in FIG. 1.

The process begins when the computer of a version control system receives an input to perform dynamic resource change backup for a primary controller node of a primary cluster in an orchestration environment (step 302). The version control system is a source of truth for resource state corresponding to any resource change in the orchestration environment. The computer establishes communication with a backup controller that monitors for changes in resources within the primary controller node of the primary cluster in the orchestration environment in response to receiving the input to perform the dynamic resource change backup for the primary controller node (step 304). The changes in the resources are a set of incremental changes in the resources and the resources are a set of resources of interest tagged for resource change backup.

The computer receives the changes in the resources from the backup controller of the primary controller node as the changes occur in real time (step 306). The computer commits the changes in the resources to the version control system as the changes are received in real time from the backup controller of the primary controller node (step 308). The computer propagates the changes in the resources from the version control system to a secondary controller node of a secondary cluster in the orchestration environment via a continuous delivery controller to synchronize the changes on the primary controller node with the resources on the secondary controller node (step 310). The resources are identical (i.e., the same resources exist) on the primary controller node and the secondary controller node.

The computer monitors the secondary controller node for a resource change that is not in the version control system using the continuous delivery controller to ensure that the changes in the resources are synchronized between the primary controller node and the secondary controller node (step 312). The computer makes a determination as to whether a resource change was detected that is not in the version control system based on monitoring the secondary controller node using the continuous delivery controller (step 314). If the computer determines that no resource change was detected that is not in the version control system based on monitoring the secondary controller node using the continuous delivery controller, no output of step 314, then the process proceeds to step 318. If the computer determines that a resource change was detected that is not in the version control system based on monitoring the secondary controller node using the continuous delivery controller, yes output of step 314, then the computer changes a state of a resource corresponding to the resource change that is not in the version control system back to a most recent state of the resource found in the version control system using the continuous delivery controller so that the resources are once again synchronized between the primary controller node and the secondary controller node (step 316).

Further, the computer monitors for an indication that the resources of the primary controller node need to be restored on a particular primary controller node in the orchestration environment in accordance with the changes (step 318). The indication is one of a detected disaster or a detected restore command. The particular primary controller node is one of the primary controller node or another primary controller node in the orchestration environment.

The computer makes a determination as to whether an indication was detected that the resources need to be restored on a particular primary controller node in accordance with the changes based on monitoring for the indication (step 320). It should be noted that the changes can be changes at a particular point-in-time or real time changes to the resources. If the computer determines that no indication was detected that the resources need to be restored on a particular primary controller node in accordance with the changes based on monitoring for the indication, no output of step 320, then the process returns to step 308 where the computer commits changes in resources to the version control system as the changes are received. If the computer determines that an indication was detected that the resources need to be restored on a particular primary controller node in accordance with the changes based on monitoring for the indication, yes output of step 320, then the computer restores the resources on the particular primary controller node in accordance with the changes based on the resources of the secondary controller node (step 322). Thereafter, the process returns to step 308 where the computer commits changes in resources to the version control system as the changes are received.

Thus, illustrative embodiments of the present disclosure provide a computer-implemented method, computer system, and computer program product for backing up resource changes in real time to provide point-in-time resource restoration. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for backing up resource changes in real time to provide resource restoration, the computer-implemented method comprising:
   receiving, by the computer, an input to perform dynamic resource change backup for a primary controller node of a primary cluster in an orchestration environment;
   establishing, by the computer, communication with a backup controller that monitors for changes in resources within the primary controller node of the primary cluster in the orchestration environment in response to receiving the input to perform the dynamic resource change backup for the primary controller node;
   receiving, by the computer, the changes in the resources from a backup controller of the primary controller node as the changes occur in real time;
   committing, by the computer, the changes in the resources to a version control system as the changes are received in real time from the backup controller of the primary controller node;
   monitoring, by a computer of the version control system, for an indication that resources of a primary controller node need to be restored on a particular primary controller node in an orchestration environment in accordance with changes in the resources; and
   restoring, by the computer, the resources on the particular primary controller node in accordance with the changes in the resources based on the resources of a secondary controller node in the orchestration environment in response to the computer determining the indication was detected that the resources need to be restored on the particular primary controller node in accordance with the changes in the resources based on the monitoring for the indication, wherein the secondary controller node maintains a synchronized real-time replica of the resources that is continuously updated as changes occur to the resources on the primary controller node.

2. The computer-implemented method of claim 1, further comprising: propagating, by the computer, the changes in the resources from the version control system to the secondary controller node of a secondary cluster in the orchestration environment via a continuous delivery controller to synchronize the changes on the primary controller node with the resources on the secondary controller node.

3. The computer-implemented method of claim 2, further comprising:
monitoring, by the computer, the secondary controller node for a resource change that is not in the version control system using the continuous delivery controller to ensure that the changes in the resources are synchronized between the primary controller node and the secondary controller node; and
changing, by the computer, a state of a resource corresponding to the resource change that is not in the version control system back to a most recent state of the resource found in the version control system using the continuous delivery controller so that the resources are once again synchronized between the primary controller node and the secondary controller node in response to the computer determining that the resource change was detected that is not in the version control system based on the monitoring of the secondary controller node using the continuous delivery controller.

4. The computer-implemented method of claim 1, wherein the version control system is a source of truth for resource state corresponding to any resource change in the orchestration environment.

5. The computer-implemented method of claim 1, wherein the changes in the resources are a set of incremental changes in the resources, wherein the resources are a set of resources of interest tagged for resource change backup.

6. The computer-implemented method of claim 1, wherein the resources are identical on the primary controller node and the secondary controller node.

7. The computer-implemented method of claim 1, wherein the indication is one of a detected disaster or a detected restore command, and wherein the particular primary controller node is one of the primary controller node or another primary controller node in the orchestration environment.

8. A computer system for backing up resource changes in real time to provide resource restoration, the computer system comprising:
a communication fabric;
a storage device connected to the communication fabric, wherein the storage device stores program instructions; and
a processor connected to the communication fabric, wherein the processor executes the program instructions to:
receive an input to perform dynamic resource change backup for a primary controller node of a primary cluster in an orchestration environment;
establish communication with a backup controller that monitors for changes in resources within the primary controller node of the primary cluster in the orchestration environment in response to receiving the input to perform the dynamic resource change backup for the primary controller node;
receive the changes in the resources from a backup controller of the primary controller node as the changes occur in real time;
commit the changes in the resources to a version control system as the changes are received in real time from the backup controller of the primary controller node;
monitor for an indication that resources of a primary controller node need to be restored on a particular primary controller node in an orchestration environment in accordance with changes in the resources, wherein the computer system corresponds to a version control system; and
restore the resources on the particular primary controller node in accordance with the changes in the resources based on the resources of a secondary controller node in the orchestration environment in response to determining the indication was detected that the resources need to be restored on the particular primary controller node in accordance with the changes in the resources based on monitoring for the indication, wherein the secondary controller node maintains a synchronized real-time replica of the resources that is continuously updated as changes occur to the resources on the primary controller node.

9. The computer system of claim 8, wherein the processor further executes the program instructions to:
propagate the changes in the resources from the version control system to the secondary controller node of a secondary cluster in the orchestration environment via a continuous delivery controller to synchronize the changes on the primary controller node with the resources on the secondary controller node.

10. The computer system of claim 9, wherein the processor further executes the program instructions to:
monitor the secondary controller node for a resource change that is not in the version control system using the continuous delivery controller to ensure that the changes in the resources are synchronized between the primary controller node and the secondary controller node; and
change a state of a resource corresponding to the resource change that is not in the version control system back to a most recent state of the resource found in the version control system using the continuous delivery controller so that the resources are once again synchronized between the primary controller node and the secondary controller node in response to determining that the resource change was detected that is not in the version control system based on monitoring the secondary controller node using the continuous delivery controller.

11. A computer program product for backing up resource changes in real time to provide resource restoration, the computer program product comprising a computer-readable storage medium having program instructions embodied therewith, the program instructions executable by a computer to cause the computer to:
receive an input to perform dynamic resource change backup for a primary controller node of a primary cluster in an orchestration environment;
establish communication with a backup controller that monitors for changes in resources within the primary controller node of the primary cluster in the orchestration environment in response to receiving the input to perform the dynamic resource change backup for the primary controller node;
receive the changes in the resources from a backup controller of the primary controller node as the changes occur in real time;
commit the changes in the resources to a version control system as the changes are received in real time from the backup controller of the primary controller node;
monitor for an indication that resources of a primary controller node need to be restored on a particular primary controller node in an orchestration environment in accordance with changes in the resources, wherein the computer corresponds to a version control system; and restore the resources on the particular primary controller node in accordance with the changes in the resources based on the resources of a secondary controller node in the orchestration environment in response to determining the indication was detected that the resources need to be restored on the particular primary controller node in accordance with the changes in the resources based on monitoring for the indication, wherein the secondary controller node maintains a synchronized real-time replica of the resources that is continuously updated as changes occur to the resources on the primary controller node.

12. The computer program product of claim 11, wherein the program instructions further cause the computer to:

propagate the changes in the resources from the version control system to the secondary controller node of a secondary cluster in the orchestration environment via a continuous delivery controller to synchronize the changes on the primary controller node with the resources on the secondary controller node.

13. The computer program product of claim 12, wherein the program instructions further cause the computer to:

monitor the secondary controller node for a resource change that is not in the version control system using the continuous delivery controller to ensure that the changes in the resources are synchronized between the primary controller node and the secondary controller node; and change a state of a resource corresponding to the resource change that is not in the version control system back to a most recent state of the resource found in the version control system using the continuous delivery controller so that the resources are once again synchronized between the primary controller node and the secondary controller node in response to determining that the resource change was detected that is not in the version control system based on monitoring the secondary controller node using the continuous delivery controller.

14. The computer program product of claim 11, wherein the version control system is a source of truth for resource state corresponding to any resource change in the orchestration environment.

15. The computer-implemented method of claim 1, wherein the resources include elements selected from a group consisting of configuration maps, secrets, and custom resources.

16. The computer-implemented method of claim 1, wherein the backup controller communicates with Application Programming Interface (API) server of the primary controller node to obtain a current state of each respective resource of the resources.

17. The computer system of claim 8, wherein the resources include elements selected from a group consisting of configuration maps, secrets, and custom resources.

18. The computer system of claim 8, wherein the backup controller communicates with Application Programming Interface (API) server of the primary controller node to obtain a current state of each respective resource of the resources.

19. The computer program product of claim 11, wherein the resources include elements selected from a group consisting of configuration maps, secrets, and custom resources.

20. The computer program product of claim 11, wherein the backup controller communicates with Application Programming Interface (API) server of the primary controller node to obtain a current state of each respective resource of the resources.

* * * * *